United States Patent Office 3,057,868
Patented Oct. 9, 1962

3,057,868
PROCESS FOR PRODUCING AROMATIC α-ACYLAMINOALKYL AND AMINOALKYL COMPOUNDS
Morizo Ishidate, 608 Koenji 4-chome, Suginamiku, Tokyo, Japan, and Minoru Sekiya, 43-1 Oiwa, Shizuokashi, Shizuokaken, Japan
No Drawing. Filed May 11, 1960, Ser. No. 28,209
Claims priority, application Japan May 13, 1959
3 Claims. (Cl. 260—287)

This invention relates to a process for producing aromatic α-acylaminoalkyl compounds by reacting an alkylidene bis-amide compound with an aromatic compound in the presence of a phosphorus oxyhalide and to a process for producing α-aminoalkyl compounds by hydrolyzing the aromatic α-acylaminoalkyl compound.

This invention relates also to the new α-acylaminoalkyl compounds as well as new α-aminoalkyl compounds resulting from the hydrolysis of the α-acylaminoalkyl compounds.

The object of the present invention is to eliminate the various defects in the known processes and to provide a process which can be applied to raw materials in a wide range.

According to the present invention an alkylidene bis-amide compound is caused to react with an aromatic compound in the presence of a phosphorus oxyhalide to carry out α-acylaminoalkylation of the aromatic nucleus. The reaction of the present invention as represented by the general formula is as follows:

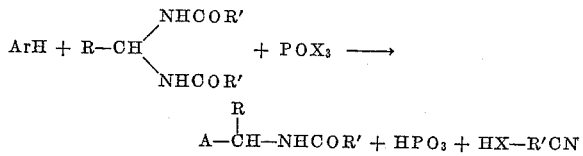

wherein $A_rH$ stands for an aromatic compound, R and R' stand for hydrogen or hydrocarbon residues and X represents a halogen.

According to the present reaction, a hydrogen halide and nitrile are advantageously by-produced in addition to the desired product.

The reaction mechanism is presumed to proceed as follows:

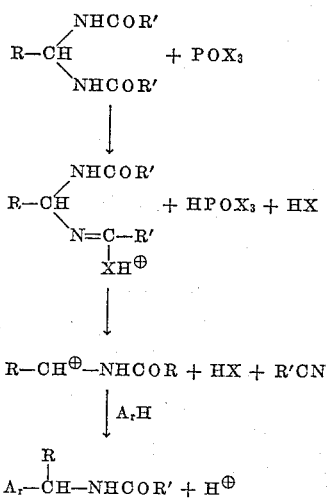

For the alkylidene bis-amide compounds which can be used any proper compound selected from the compounds represented by the above mentioned general formula wherein R and R' are, for example, hydrogen, alkyl such as methyl, ethyl, propyl and the like, hydrocarbon residue such as phenyl, benzyl, phenethyl and the like.

The position in the nucleus at which α-acylaminoalkyl group is introduced therein is different and is not specifically fixed depending on the position and kind of the substituent of the raw material or the number of such substituents. However, generally, in a phenyl nucleus, said group is liable to enter ortho- or para-position against such substituent. As it may be individually or simultaneously introduced into different positions, the product may be a mixture of two or more kinds.

The reaction in the present invention proceeds so comparatively readily that the reaction temperature need not be so high, to obtain the product in very pure state and with high yield.

For example, though the reaction temperature is properly adjusted depending on the kind of the raw material, that is the strength of the activity of the nucleus substituent, generally the reaction will satisfactorily proceed at a temperature of about 90 to 96° C. on a water bath. In the present reaction, such inert solvent as, for example, chloroform, benzene or carbon tetrachloride may be used. In case the reaction occurs so quickly that the adjustment of the temperature is difficult, the presence of such reaction solvent results in a smooth reaction and in an obtainment of the product in a pure state.

The phosphorus oxyhalide to be used in the reaction is generally preferably about half the mols of the raw material.

The reaction product obtained may be subjected to hydrolysis with an acid or alkali in the conventional manner to give amino substitution product resulting from separation of acyl radical in the α-acylaminoalkyl group. In such case, the other substituent in the nucleus may be simultaneously hydrolyzed. Under some condition, only the latter substituent may be hydrolyzed.

The following experiment teaches that the effects obtained by the process of the present invention are not merely the results of the action of the condensing agent.

That is to say, with a view to confirming the effect resulting from the presence of the condensing agent in the present reaction, the inventors studied the influences of other condensing agents besides the phosphorus oxyhalide, for example, inorganic chlorides such as thionyl chloride, sulfuryl chloride, phosphorus trichloride, phosphorus pentachloride and the like. From the study we obtained such results as in the following table:

| Condensing agents | Mol ratio | Yields of crude product, percent |
|---|---|---|
| Phosphorus oxychloride | 1:1:0.5 | 92 |
| Phosphorus trichloride | 1:1:0.4 | 68 |
| Phosphorus pentachloride | 1:1:0.5 | (¹) |
| Thionyl chloride | 1:1:1 | 37 |
| Sulfuryl chloride | 1:1:0.5 | 31 |

¹ No crystal was produced.

The mol ratio in the table are of 2.4-xylenol:methylene bis-acetamide:condensing agent.

By the way, the above mentioned results are of experiments in which 5 g. of 2,4-xylenol were heated in 25 cc. of benzene for 3 hours.

It is thus recognized that no favorable results are obtained with general condensing agents and that the functional effect of the present invention is not due to the action of the condensing agent but is due to the special action of the phosphorus oxyhalide as presumed from the above mentioned reaction mechanism.

Thus according to the present invention there is provided a new α-acylaminoalkylation reaction process by which an α-acylaminoalkyl group may be introduced into the nucleus of a general aromatic compound, said reaction process being very universal, industrially advantageous and useful in the synthetic chemistry.

The present invention will be illustrated by way of the following examples which are mere exemplifications but which do not limit the technique and applicable range of the process of the present invention.

*Example 1*

A mixture of 188 g. (0.2 mol) of phenol, 31.2 g. (0.24 mol) of N,N'-methylene bis-acetamide, 80 cc. of chloroform and 15.4 g. (0.1 mol) of phosphorus oxychloride is refluxed on a water bath. With the reaction, hydrogen chloride gas gradually evolves. After the reaction for 4 hours, the reaction solution is poured into water and sodium bicarbonate is added thereto to neutralize the acid. The chloroform layer is separated together with the oil layer and subjected to distillation. The distillation residue free from chloroform is then distilled under a reduced pressure. 3.9 g. of phenol may be recovered in the initial distillate. Further distillation under a reduced pressure in a higher vacuum gives 84 g. (yield 25%) of a solid fraction, B.P. 200 to 205° C. (0.02 mm.) as the first fraction. By recrystallization from ether, said solid fraction crystallizes out in a form of needle, M.P. 139 to 140° C. Any depression of melting point is not observed at mixed melting point determination of said needle with separately synthesized pure authentic specimen of N-(2-hydroxybenzyl)-acetamide. Then 6.9 g. (yield 21%) of a solid fraction, B.P. 221 to 225° C. (0.02 mm.) obtained as the second fraction, is recrystallized from chloroform, whereupon said solid fraction crystallizes out in a form of needle, M.P. 131 to 132° C. Said needle crystals do not show any depression of melting point at the mixed melting determination with separately synthesized pure authentic specimen of N-(4-hydroxybenzyl)-acetamide.

10 g. of N-(2-hydroxybenzyl)-acetamide thus obtained are heated in 30 cc. of a sodium hydroxide solution for 2 hours on a water bath. The reaction solution is concentrated under a reduced pressure. Recrystallization of concentrated residue from ether gives 7.3 g. of 2-hydroxybenzylamine. Yield 95%, M.P. 125° C.

*Example 2*

12.2 g. (0.1 mol) of 2.4-xylenol, 15.6 g. (0.12 mol) of N,N'-methylene bis-acetamide and 7.7 g. (0.05 mol) of phosphorus oxychloride are heated on a boiling water bath for 1 hour. From the reaction accompanied by evolution of hydrogen chloride gas, uniformly viscous reaction product may be obtained. After addition of cold water, the reaction product is added with sodium bicarbonate to neutralize acid. The crystals deposited and recovered by filtration (the yield was 18.1 g. corresponding to 94%) is recrystallized from alcohol, whereupon N-(2-hydroxy-3.5-dimethylbenzyl)-acetamide, M.P. 146 to 147° C. may be obtained.

When the above reaction will be carried out with addition of 50 cc. of benzene for 1.5 hours and treated in the same manner, the acetylamidomethyl body formed a phosphate in the lower layer which moves into the benzene by neutralization. The residue soon crystallized. Yield, 178 g. (92%). Recrystallization from alcohol, gives the same desired product, M.P. 146 to 147° C.

*Example 3*

7 g. (0.05 mol) of 4-nitrophenol (0.05 mol), 7.8 g. (0.06 mol) of N,N'-methylene bis-acetamide and 38 g. (0.025 mol) of phosphorus oxychloride are heated on a boiling water bath, whereupon hydrogen chloride gas is evolved. After the reaction for 1 hours, water is added thereto and the deposited crystal is recovered by filtration. The yield is 9 g. (85%). Recrystallization from alcohol gives N-(2-hydroxy-5-nitrobenzyl)-acetamide as a columnar crystal, M.P. 192 to 193° C.

9 g. of N-(2-hydroxy-5-nitrobenzyl)-acetamide thus obtained are heated in 20 cc. of 10% hydrochloric acid for 2 hours on a water bath. The reaction solution is concentrated under a reduced pressure. The concentrated residue is neutralized with a 10% sodium carbonate solution. Recrystallization of the crystals from water gives 6.7 g. of 2-hydroxy-5-nitrobenzylamine. Yield 96%, M.P. 253° C.

*Example 4*

7.2 g. (0.05 mol) of 2-naphthol, 7.8 g. (0.06 mol) of N,N'-methylene bis-acetamide and 3.8 g. (0.025 mol) of phosphorus oxychloride are caused to react together with 60 cc. of chloroform on a water bath for 1.5 hours under evolution of hydrogen chloride gas. After treatment of the reaction mixture with sodium bicarbonate solution, chloroform layer is recovered and dried. Chloroform is removed by distillation, whereupon 10 g. (94%) of N-(2-hydroxyl-1-naphthylmethyl)-acetamide may be obtained as a crystalline residue. By means of recrystallization of the residue from alcohol, it becomes small needle crystal, M.P. 165 to 166° C.

When the above reaction is carried out without adding any solvent, the reaction is so severe that it is difficult to adjust the temperature and therefore the product is liable to become resinous and is impure.

10 g. of N-(2-hydroxy-1-naphthylmethyl)-acetamide thus obtained are heated in 20 cc. of 10% hydrochloric acid for 2 hours on a water bath. The reaction solution is concentrated under a reduced pressure. The concentrated residue is neutralized with a 10% sodium carbonate solution. When the deposited crystal is recrystallized from ligroin, 7.6 g. of 2-hydroxy-1-naphthylmethylamine may be obtained. Yield 95%, M.P. 115° C.

*Example 5*

5 g. (0.033 mol) of N-2-tolylacetamide, 5.2 g. (0.04 mol) of N,N'-methylene bis-acetamide and 2.45 g. (0.016 mol) of phosphorus oxychloride are heated to 130 to 135° C. in an oil bath. They reacted while hydrogen chloride gas is evolved. After one hour the reaction mixture is added with water and treated with sodium bicarbonate. The deposited oily substance is extracted with chloroform. After the extract is dried, chloroform is removed by distillation. The viscous oily residue is crystallized with a small amount of alcohol, whereupon g. (86.3%) of N,N'-diacetyl-2-amino-5-aminomethyltoluene may be obtained. Recrystallization from alcohol gives needle crystals, M.P. 179 to 180° C.

*Example 6*

5 g. (0.033 mol) of N-4-tolylacetamide, 5.2 g. (0.04 mol) of N,N'-methylene bis-acetamide and 2.45 g. (0.016 mol) of phosphorus oxychloride are heated to 130 to 135° C. in an oil bath to react while evolving hydrogen chloride gas. After the reaction for one hour, the reaction mixture is treated in the same manner as in the preceding example and viscous oily residue is left to crystallize, thereby 5.2 g. (71%) of N,N'-diacetyl-3-aminomethyl-4-aminotoluene may be obtained. On recrystallization from alcohol, needle crystals, M.P. 177 to 178° C. are formed.

*Example 7*

21.6 g. (0.2 mol) of anisole, 31.2 g. (0.24 mol) of N,N'-methylene bis-acetamide, and 12.3 g. (0.08 mol) of phosphorus oxychloride are carefully mixed together and heated in a boiling water bath for three hours to react while hydrogen chloride gas is evolved. The sticky reaction product thus formed is treated with aqueous sodium carbonate solution. The oily substance liberated is extracted with chloroform. After the extract is dried, the chloroform is removed by distillation. When the residue is subjected to distillation under a reduced pressure, 1 g. of anisole may be recovered in the initial distillate. By further distillation three fractions of B.P. 135 to 140° C. (2 mm.), 160 to 163° C. (2 mm.) and 195 to 197° C. (0.0025 mm.) respectively are obtained.

The first fraction, yield 5.1 g. (15%), is recrystallized from alcohol, whereupon 4.4'-dimethoxydiphenylmethane may be obtained in a form of plate crystals, M.P. 52 to 53° C.

The second fraction, yield 16.4 g. (47.5%), is recrystallized from alcohol, whereupon 4-acetaminomethylanisole may be obtained in a form of plate crystal, M.P. 94 to 95° C.

On the recrystallization of the third fraction, 13 g. (38%) from a benzene-alcohol mixed solution, N,N'-diacetyl-2,4-diaminomethylanisole in a form of needle crystal are obtained.

10 g. of 4-acetaminomethylanisole obtained are heated in 20 cc. of 10% hydrochloric acid for 2 hours on a water bath. The reaction solution is concentrated under a reduced pressure. Recrystallization of the residue from water gives 7.1 g. of 4-aminomethylanisole hydrochloride. Yield 94%, M.P. 230° C.

Example 8

3.5 g. (0.025 mol) of 8-hydroxyquinoline, 4 g. (0.03 mol.) of N,N'-methylene bis-acetamide and 2 g. (0.012 mol) of phosphorus oxychloride are heated on a boiling water bath for two hours. The reaction mixture is treated with water and sodium bicarbonate. The oily substance formed is extracted with chloroform and dried. When chloroform is removed under distillation, the residue is solidified, yield 4.5 g. (84%). On recrystallization from alcohol, light yellow needle crystals of N-acetyl-5-aminomethyl-8-hydroxyquinoline, M.P. 184–186° C. may be obtained.

Example 9

6.9 g. (0.05 mol) of salicylic acid, 7.3 g. (0.06 mol) of N,N'-methylene bis-acetamide and 3.9 g. (0.025 mol) of phosphorus oxychloride are heated for one hour in a boiling water bath to react while evolving hydrogen chloride gas. On addition of water to the reaction mixture, a viscous substance is deposited. Washing of the substance with water gives 5.5 g. (53%) of a product. As this product is difficult to crystallize, in order to hydrolyze it, 3 g. of the product are boiled together with 20 cc. of 10% hydrochloric acid for 2 hours. When the reaction solution is concentrated under a reduced pressure, 275 g. (94%) of a crystal of the hydrochloride may be obtained. When it is recrystallized from dilute hydrochloric acid, hydrochloride of 2-hydroxy-5-aminomethyl benzoic acid may be obtained as a needle crystal, M.P. 217° C. (decompose).

Example 10

4.3 g. (0.025 mol) of 1-phenyl-3-methylpyrazolone-(5), 3.9 g. (0.03 mol) of N,N'-methylene bis-acetamide and 1.9 g. (0.013 mol) of phosphorus oxychloride are reacted at 70 to 75° C. on a water bath for one hour. No hydrogen chloride gas is evolved. After addition of water to the reaction product, 1.5 g. of the insoluble substance are removed by filtration. On addition of sodium bicarbonate to the filtrate, semisolid substance is deposited. It is extracted with chloroform and dried. After removing chloroform by distillation, 3.4 g. (55.5%) of residue may be obtained.

On recrystallization from alcohol, 1-phenyl-3-methyl-4-acetylaminomethyl-5-pyrazolone in a form of small needle crystal, M.P. 183 to 184° C. may be obtained.

Example 11

6.1 g. (0.05 mol) of 4-methoxytoluene, 7.8 g. (0.06 mol) of N,N'-methylene bis-acetamide and 3.9 g. (0.025 mol) of phosphorus oxychloride are heated for one hour in a boiling water bath to react. To the reaction mixture, water is added then neutralized with sodium bicarbonate. The deposit is extracted with benzene and dried. After removal of benzene by distillation, 9.0 g. (93.2%) of a solid substance may be obtained. After crystallization with a small amount of petroleum ether the crystal is recrystallized from ligroinbenzene, whereupon N-(2-methoxy-5-methylbenzyl)-acetamide in a form of needle crystal, M.P. 96° C. may be obtained.

Example 12

24.4 g. (0.2 mol) of 2.4-xylenol, 61 g. (0.24 mol) of N,N'-methylene bis-acetamide and 15.3 g. (0.1 mol) of phosphorus oxychloride are treated in the same manner as in the preceding example. The residue from which the benzene has been distilled out is subjected to the steam-distillation to remove the volatile substance, whereupon the residue may crystallize. Yield, 46.4 g. (91%). Recrystallization from a large amount of petroleum ether results in N-(2-hydroxy-3,5-dimethylbenzyl)-benzamide in a columnar crystal, M.P. 119 to 120° C.

Example 13

6.1 g. (0.05 mol) of 2.4-xylenol, 9.5 g. (0.06 mol) of N,N'-methylene bis-propionamide and 3.8 g. (0.025 mol) of phosphorus oxychloride are treated in the same manner as in the preceding example to obtain 9.2 g. (88.9%) of a viscous residue. Recrystallization from petroleum benzine gives N-(2-hydroxy-3,5-dimethylbenzyl)-propionamide in a form of needle crystal, M.P. 106° C.

Example 14

6.1 g. (0.06 mol) of methylene bis-formamide are used instead of the propionamide compound in Example 13. The mixture is treated in the same manner, whereupon 3.4 g. (38.2%) of a viscous distillation residue may be obtained. Recrystallization from petroleum benzine, results in N-(2-hydroxy-3,5-dimethylbenzyl)-formamide in a form of needle crystal, M. P. 116.5 to 117° C.

Example 15

6 g. (0.05 mol) of 2.4-xylenol, 11.5 g. (0.06 mol) of N,N'-benzylidene bis-acetamide and 3.8 g. (0.025 mol) of phosphorus oxychloride are caused to react in a boiling water bath for 1.5 hours, and treated in the same manner as in the preceding example, whereupon 13.2 g. (98%) of N-(2-hydroxy - 3,5 - dimethyldiphenylmethyl) - acetamide may be obtained. After recrystallization from alcohol, the melting point becomes 150 to 152° C.

When the above reaction is carried out by adding 30 cc. of chloroform, 112 g. (83%) of the same object may be obtained.

Example 16

3.6 g. (0.025 mol) of 2-naphthol, 5.76 g. (0.03 mol) of N,N'-benzylidene bis-acetamide and 1.84 g. (0.012 mol) of phosphorus oxychloride are heated together with 20 cc. of benzene in a water bath for 1.5 hours to react while evolving hydrogen chloride gas. At the beginning of the reaction, the reaction solution is uniform but, with the progress of the reaction, it separates into two layers having a semicrystalline lower layer. After the reaction, benzene in the upper layer is removed by decantation. Water is added to the lower layer, which is then treated with sodium bicarbonate and the insoluble crystal formed is removed by filtration. Yield, 7.2 g. (98%). Recrystallization from an alcohol-acetic acid mixed solution, gives a needle crystal of N-(2-hydroxy - 2 - naphthylphenylmethyl) - acetamide, M.P. 240–241° C.

Example 17

3.5 g. (0.025 mol) of 4-nitrophenol, 5.76 g. (0.03 mol) of N,N'-benzylidene bis-acetamide and 1.84 g. (0.012 mol) of phosphorus oxychloride are caused to react in a boiling water bath for one hour while evolving hydrogen chloride gas. To the reaction mixture, water is added. The viscous mass formed is washed with water and then subjected to steam distillation to remove benzaldehyde, thereby residue crystallizes. Yield, 5.8 g. (81%). On recrystallization from alcohol, N-(2-hydroxy-5-nitrodiphenylmethyl)-acetamide in a form of needle crystal, M.P. 208 to 209° C. may be obtained.

5 g. of N-(2-hydroxy-5-nitrodiphenylmethyl)-acetamide obtained are heated in 15 cc. of 10% hydrochloric acid and 10% aqueous alcohol for 2 hours on a water bath. The reaction solution is concentrated under a reduced pressure. The residue is neutralized with sodium carbonate solution. On recrystallization of the crystal deposited from ether, 4 g. of 2-hydroxy-5-nitrodiphenylmethylamine may be obtained. Yield, 93%, M.P. 125° C.

*Example 18*

5 g. (0.033 mol) of N-2-tolylacetamide, 7.7 g. (0.04 mol) of N,N'-benzylidene bis-acetamide and 2.45 g. (0.016 mol) of phosphorus oxychloride are caused to react in an oil bath at 125 to 130° C. for 2 hours while evolving hydrogen chloride gas. To the reaction mixture cold water is added and then treated with sodium bicarbonate. The crystal deposited is recovered by filtration. On recrystallization from 9.57 g. (98%) of glacial acetic acid, N,N'-diacetyl-3-methyl-4-aminodiphenylmethylamine in a form of needle crystal, M.P. 269 to 270° C. may be obtained.

*Example 19*

6.1 g. (0.05 mol) of 4-methoxytoluene, 12.4 g. (0.06 mol) of N,N'-benzylidene bis-acetamide and 3.9 g. (0.025 mol) of phosphorus oxychloride are caused to react and treated in the same manner as in Example 11, whereupon 13.2 g. (91.45%) of a crude product of N-(2-methoxy-5-methyldiphenylmethyl)-acetamide may be obtained. Recrystallization from petroleum ether and alcohol gives plate crystal, M.P. 132 to 133° C.

*Example 20*

6 g. (0.05 mol) of 2.4-xylenol, 8.6 g. (0.06 mol) of N,N'-ethylene bis-acetamide and 3.8 g. (0.025 mol) of phosphorus oxychloride are caused to react with the addition of 20 cc. of benzene in a water bath for 3 hours while evolving hydrogen chloride gas. The reaction mixture is treated with aqueous sodium bicarbonate solution. The benzene layer is recovered and dried. The residue resulting from distillation is further subjected to distillation under a reduced pressure. After a slight amount of the unreacted xylenol has been distilled out, 7.6 g. (74%) of a fraction at 142 to 152° C. (1 mm.) may be obtained.

The fraction will be crystallized after 2 weeks. On recrystallization from a petroleum ether-ether mixed solution, N-acetyl-2-hydroxy-3.5-dimethyl-α-phenylethylamine in a form of scaly crystal, M.P. 105 to 106° C. may be obtained.

What we claim is:

1. A process for producing aromatic alpha-acylaminoalkyl compounds which comprises reacting an alkyl idene bis-amide selected from the group consisting of N,N'-methylene bis-acetamide, N,N'-benzylidene bis-acetamide, N,N'-methylene bis-propionamide, and N,N'-ethylene bis-acetamide with an aromatic compound selected from the group consisting of phenol, 2,4-xylenol, 4-nitrophenol, 2-naphthol, N-2-tolylacetamide, N-4-tolylacetamide, anisole, 8-hydroxyquinoline, salicylic acid, 1-phenyl-3-methylpyrazolone-(5), and 4-methoxytoluene in the presence of phosphorus oxychloride in an inert solvent selected from the group consisting of chloroform, benzene and carbon tetrachloride at a temperature of between 90–96° C.

2. A process for producing aromatic aminoalkyl compounds which comprises reacting an alkyl idene bis-amide selected from the group consisting of N,N'-methylene bis-acetamide, N,N'-benzylidene bis-acetamide, N,N'-methylene bis-propionamide, and N,N'-ethylene bis-acetamide with an aromatic compound selected from the group consisting of phenol, 2,4-xylenol, 4-nitrophenol, 2-naphthol, N-2-tolylacetamide, N-4-tolylacetamide, anisole, 8-hydroxyquinoline, salicylic acid, 1-phenyl-3-methylpyrazolone-(5), and 4-methoxytoluene in the presence of phosphorus oxychloride in an inert solvent selected from the group consisting of chloroform, benzene and carbon tetrachloride at a temperature of between 90–96° C. and thereafter hydrolyzing the resultant with a mixture of 10% aqueous solution of hydrochloric acid and a 10% aqueous solution of alcohol.

3. A process for producing aromatic alpha-acylaminoalkyl compounds which comprises reacting an alkyl idene bis-amide selected from the group consisting of N,N'-methylene bis-acetamide, N,N'-benzylidene bis-acetamide, N,N'-methylene bis-propionamide, and N,N'-ethylene bis-acetamide with an aromatic compound selected from the group consisting of phenol, 2,4-xylenol, 4-nitrophenol, 2-naphthol, N-2-tolylacetamide, N-4-tolylacetamide, anisole, 8-hydroxyquinoline, salicylic acid, 1-phenyl-3-methylpyrazolone-(5), and 4-methoxytoluene in the presence of phosphorus oxychloride.

References Cited in the file of this patent

UNITED STATES PATENTS 3,024,282    Parris                 Mar. 6, 1962

OTHER REFERENCES

Cromwell: Jour. Am. Chem. Sov., volume 68, pages 2634–36 (1946).

Degering: "An Outline of Organic Nitrogen Compounds," published by University Lithoprinters (Ypsilanti, Mich.), page 311 (1950).

Stefanovic et al.: "Recuell des Travaux Chimiques des Pays-Bas," volume 76, pages 249–260 (1957).